US008660097B2

(12) United States Patent
Kenchareddy et al.

(10) Patent No.: US 8,660,097 B2
(45) Date of Patent: Feb. 25, 2014

(54) METHODS AND APPARATUS FOR SERVICE CONTINUITY IN A COMMUNICATION NETWORK

(75) Inventors: Sanjay Kenchareddy, San Diego, CA (US); Vivek Venkatesh Ramachandran, San Digeo, CA (US); Daniel Amerga, San Diego, CA (US); Supratik Bhattacharjee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 721 days.

(21) Appl. No.: 12/749,646

(22) Filed: Mar. 30, 2010

(65) Prior Publication Data

US 2011/0243051 A1 Oct. 6, 2011

(51) Int. Cl.
H04J 3/00 (2006.01)
(52) U.S. Cl.
USPC .............................. 370/336; 370/329; 370/342
(58) Field of Classification Search
USPC ......... 370/331, 332, 338, 436, 336, 329, 342; 455/436
See application file for complete search history.

(56) References Cited

U.S. PATENT DOCUMENTS

| | | | |
|---|---|---|---|
| 5,278,991 A * | 1/1994 | Ramsdale et al. | 455/444 |
| 5,822,697 A * | 10/1998 | Matsuzawa | 455/443 |
| 6,330,668 B1 | 12/2001 | Curiger et al. | |
| 6,360,264 B1 | 3/2002 | Rom | |
| 6,535,013 B2 | 3/2003 | Samaan | |
| 6,553,545 B1 | 4/2003 | Stinson et al. | |
| 6,621,302 B2 | 9/2003 | Lowy et al. | |
| 6,777,708 B1 | 8/2004 | Lin et al. | |
| 6,882,238 B2 | 4/2005 | Kurd et al. | |
| 6,975,608 B1 * | 12/2005 | Park et al. | 370/332 |
| 7,071,723 B2 | 7/2006 | Krishnamoorthy et al. | |
| 7,089,143 B2 | 8/2006 | Foreman et al. | |
| 7,187,599 B2 | 3/2007 | Schnell et al. | |
| 7,305,599 B1 | 12/2007 | Duce et al. | |
| 7,321,254 B2 | 1/2008 | Li et al. | |

(Continued)

FOREIGN PATENT DOCUMENTS

WO 2009090516 A1 7/2009

OTHER PUBLICATIONS

International Search Report and Written Opinion—PCT/US2011/030517, ISA/EPO—Oct. 18, 2011.

(Continued)

*Primary Examiner* — Ricky Ngo
*Assistant Examiner* — Dewanda Samuel
(74) *Attorney, Agent, or Firm* — Abdollah Katbab

(57) ABSTRACT

Methods and apparatus for service continuity in a communication network. A method includes receiving a service in a first network coverage area, detecting entry into a second coverage area, acquiring control signaling information of the second coverage area in response to entering into the second coverage area, establishing traffic channels in the second coverage area while the service is received from the first coverage area, and switching to receive the service on the traffic channels in the second coverage area so that service disruption is minimized. Another method includes receiving a service in a first network coverage area, acquiring control signaling information associated with other coverage areas while in the first coverage area, detecting entry into a second coverage area, establishing traffic channels in the second coverage area, and switching to receive the service on the traffic channels in the second coverage area so that service disruption is minimized.

40 Claims, 7 Drawing Sheets

(56) References Cited

U.S. PATENT DOCUMENTS

| | | | |
|---|---|---|---|
| 7,461,305 | B1 | 12/2008 | Klass et al. |
| 7,541,829 | B1 | 6/2009 | Bolam et al. |
| 7,542,862 | B2 | 6/2009 | Singh et al. |
| 7,622,979 | B2 | 11/2009 | Bhatia et al. |
| 7,664,064 | B2 * | 2/2010 | Lee et al. ............ 370/331 |
| 7,671,579 | B1 | 3/2010 | Chong et al. |
| 7,681,157 | B2 | 3/2010 | Buck et al. |
| 7,884,619 | B1 | 2/2011 | Chong et al. |
| 8,031,735 | B2 * | 10/2011 | Kuo ..................... 370/430 |
| 8,040,849 | B2 * | 10/2011 | Mudigonda et al. ...... 370/331 |
| 8,143,910 | B2 | 3/2012 | Kobatake |
| 8,175,069 | B2 * | 5/2012 | Wang et al. ............ 370/343 |
| 8,509,183 | B2 * | 8/2013 | Kim et al. ............. 370/331 |
| 2003/0231612 | A1 * | 12/2003 | Kim et al. ............. 370/342 |
| 2004/0033805 | A1 | 2/2004 | Verma et al. |
| 2004/0202140 | A1 * | 10/2004 | Kim et al. ............. 370/335 |
| 2005/0111395 | A1 * | 5/2005 | Hwang et al. .......... 370/313 |
| 2005/0118992 | A1 * | 6/2005 | Jeong et al. ........... 455/422.1 |
| 2006/0035639 | A1 | 2/2006 | Etemad et al. |
| 2006/0084439 | A1 | 4/2006 | Joshi et al. |
| 2006/0274780 | A1 * | 12/2006 | Walsh et al. .......... 370/458 |
| 2007/0191018 | A1 * | 8/2007 | Terry ................. 455/450 |
| 2010/0283051 | A1 | 11/2010 | Mayor |
| 2011/0245948 | A1 | 10/2011 | Bai et al. |

OTHER PUBLICATIONS

Partial International Search Report—PCT/US2011/030517, ISA/EPO—Jun. 30, 2011.

Drake Alan, et al.,. "A Distributed Critical-Path Timing Monitor for a 65nm High-Performance Microprocessor," 2007 IEEE International Solid-state Circuits Conference, Session 22, Digital Circuit Innovations, pp. 398-399.

Mukhopadhyay, Saibal et al. "An On-Chip Test Structure and Digital Measurement Method for Statistical Characterization of Local Random Variability in a Process," IEEE Journal of Solid-State Circuits, vol. 43, No. 9, Sep. 2008, pp. 1951-1963.

* cited by examiner

METHODS AND APPARATUS FOR SERVICE CONTINUITY IN A COMMUNICATION NETWORK

BACKGROUND

1. Field

The present application relates generally to the operation of communication systems, and more particularly, to methods and apparatus for service continuity in a communication network.

2. Background

Wireless cellular telecommunication networks are now commonly known and in widespread use. In this regard, the area covered by a telecommunication network is divided into cells and each cell is provided with at least one base station. The base stations are configured to communicate with mobile stations (MS) or other user equipment (UE) located in their respective cells.

Various standards have been proposed for communication within telecommunication networks. For example, one known standard is the Global System for Mobile Communications (GSM) standard. This standard is primarily designed for speech communications. Another standard is the General Packet Radio Service (GPRS) standard that addresses the transmission of data. The GPRS standard has generally been proposed in the context of the GSM standard. The GSM standard allows circuit switched communication while the GPRS standard allows packet switched communication. Other standards include wideband code division multiple access (WCDMA) systems that are part of Universal Mobile Telecommunications Systems (UMTS) in addition to long term evolution (LTE) systems.

Mobile stations operating in a cell establish traffic channels within the cell with which to receive broadcasts or multicasts of television programs, streaming video, streaming audio, and other multimedia content. Such services are commonly referred to as multimedia broadcast multicast services (MBMS). A MBMS might be transmitted throughout a single cell or throughout several contiguous or overlapping cells. A set of cells receiving a MBMS can be referred to as a service area.

When a mobile station moves, it may move from a location in a first coverage area to a location in a second coverage area. If the mobile station was receiving a MBMS on a traffic channel prior to moving, there may be an interruption in service reception due to the time taken to acquire control information and establish new traffic channels on the new coverage area. This process is known as reselection. Based on current technology, the disruption may be as long as a few tens of seconds. This service disruption may result in loss of audio or video, jumps, static or other annoying effects that will directly affect the device user's experience.

Therefore, what is needed is a mechanism that operates to overcome the problems associated with conventional systems to provide efficient use of air resources and minimize interruptions for the end user when a mobile station performs reselection in a communication network.

SUMMARY

In one or more aspects, a service continuity system, comprising methods and apparatus, is provided that operates to provide service continuity for mobile stations resulting in better service reception, minimized interruptions during reselection, and an enhanced user experience.

In an aspect, a method is provided for service continuity in a communication network. The method comprises receiving a broadcast/multicast service in a first coverage area of the communication network, detecting entry into a second coverage area of the communication network, and receiving control signaling information associated with the second coverage area in response to detecting entry into the second coverage area. The method also comprises establishing one or more traffic channels in the second coverage area while the broadcast/multicast service is received from the first coverage area, and switching to receive the broadcast/multicast service on the one or more traffic channels in the second coverage area so that service disruption is minimized.

In an aspect, an apparatus is provided for service continuity in a communication network. The apparatus comprises a transceiver configured to receive a broadcast/multicast service in a first coverage area of the communication network, and a processor coupled to the transceiver and configured to detect entry into a second coverage area of the communication network, receive control signaling information associated with the second coverage area in response to detecting entry into the second coverage area, establish one or more traffic channels in the second coverage area while the broadcast/multicast service is received from the first coverage area, and switch to receive the broadcast/multicast service on the one or more traffic channels in the second coverage area so that service disruption is minimized.

In an aspect, an apparatus is provided for service continuity in a communication network. The apparatus comprises means for receiving a broadcast/multicast service in a first coverage area of the communication network, means for detecting entry into a second coverage area of the communication network, means for receiving control signaling information associated with the second coverage area in response to detecting entry into the second coverage area, means for establishing one or more traffic channels in the second coverage area while the broadcast/multicast service is received from the first coverage area, and means for switching to receive the broadcast/multicast service on the one or more traffic channels in the second coverage area so that service disruption is minimized.

In an aspect, a computer program product is provided for service continuity in a communication network. The computer program product comprises a computer-readable medium embodying codes executable by a processor to receive a broadcast/multicast service in a first coverage area of the communication network, detect entry into a second coverage area of the communication network, receive control signaling information associated with the second coverage area in response to detecting entry into the second coverage area, establish one or more traffic channels in the second coverage area while the broadcast/multicast service is received from the first coverage area, and switch to receive the broadcast/multicast service on the one or more traffic channels in the second coverage area so that service disruption is minimized.

In an aspect, a method is provided for service continuity in a communication network. The method comprises receiving a broadcast/multicast service in a first coverage area of the communication network, acquiring control signaling information associated with one or more other coverage areas while in the first coverage area, detecting entry into a second coverage area that is part of the one or more other coverage areas, establishing one or more traffic channels in the second coverage area, and switching to receive the broadcast/multicast service on the one or more traffic channels in the second coverage area so that service disruption is minimized.

In an aspect, an apparatus is provided for service continuity in a communication network. The apparatus comprises a transceiver for receiving a broadcast/multicast service in a first coverage area of the communication network, and a processor coupled to the transceiver and configured to acquire control signaling information associated with one or more other coverage areas while in the first coverage area, detect entry into a second coverage area that is part of the one or more other coverage areas, establish one or more traffic channels in the second coverage area, and switch to receive the broadcast/multicast service on the one or more traffic channels in the second coverage area so that service disruption is minimized.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes implementations of a service continuity system that operate to provide service continuity for mobile stations as they move across coverage areas of a communication network. For example, the system operates to allow a mobile station (also referred to as a mobile device or user equipment) to maintain continuous reception of a MBMS service while moving across coverage areas of a wireless communication network.

As discussed below, the system provides several operating modes to maintain service continuity. In a first operating mode, an overlapping time interval is provided between reception of the MBMS service on traffic channel(s) of a previous coverage area and reception of control channel information in a new coverage area. The overlapping time interval allows the mobile device to establish traffic channels to continue to receive the MBMS service in the new coverage area before service in the previous coverage area is lost. The overlapping time interval occurs after the mobile device has moved into the new coverage area. This results in service continuity since the device continues to receive the MBMS service during the time the control channel information in the new coverage area is acquired.

In a second operating mode, service continuity is maintained during device mobility by pro-actively reading control channel information in neighboring coverage areas before the mobile device moves away from its current coverage area. In this operating mode, the system acquires control signaling information for other coverage areas based on signal strength criteria and stores the control signaling information so that the mobile device can quickly configure traffic channels in a new coverage area as soon as the mobile device moves to the new coverage area. This results in service continuity since the device is already prepared to continue to receive the MBMS service when it moves into the new coverage area.

This second mode of operation is also applicable when the device is in an idle mode where an active traffic channel has not been established in the first coverage area. The system again acquires the control channel information in neighboring coverage areas before the mobile device moves away from its current coverage area. When the device moves to the new coverage area an active traffic channel can be quickly established since the control signaling information for that coverage area is already stored and available.

The above modes of operation provided by the service continuity system are discussed in detail below with respect to a multicast/broadcast communication network; however, the teachings of the service continuity system can be extended to other types of communication networks as well.

Figure 1:
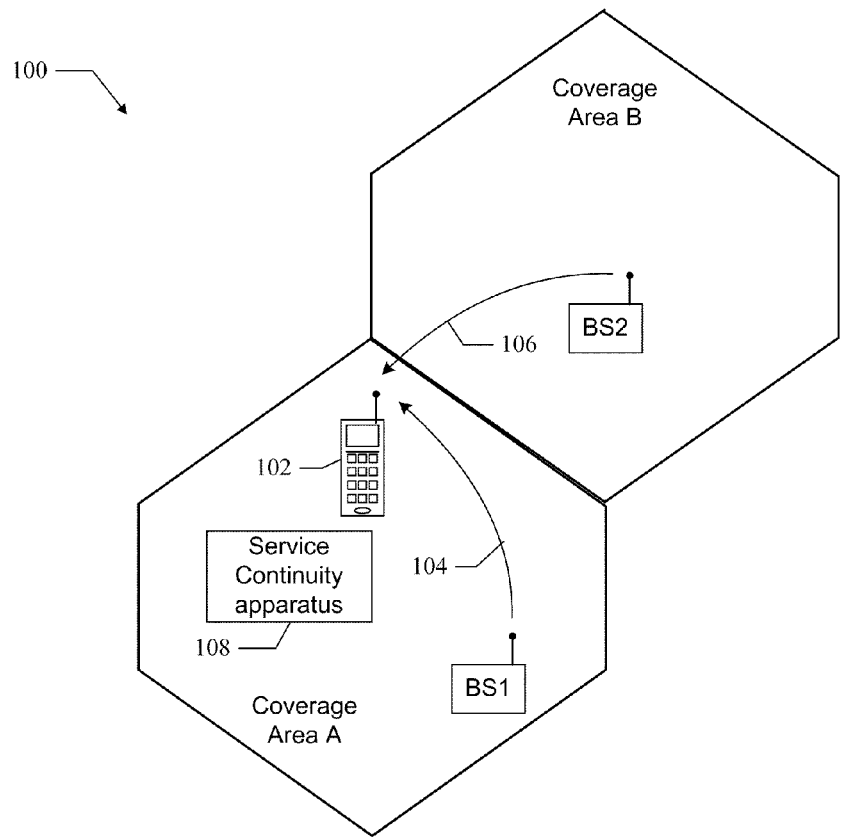
FIG. 1 shows an exemplary communication network that illustrates aspects of a service continuity system.

FIG. 1 shows a network 100 that illustrates aspects of a service continuity system. The network 100 comprises two coverage areas (A and B). Each of the coverage areas includes a base station (BS) for communicating with devices in their local regions. The network 100 also comprises a device 102. The device 102 may be a mobile telephone, PDA, notebook computer, pager, multimedia device, or any other type of device that is operable to communicate with the base stations in the coverage areas. It should be noted that the implementations of the service continuity system discussed herein are suitable for use with virtually any number of devices.

The network 100 operates to transmit MBMS services, which can include two components; a multicast control channel (MCCH) and a multicast traffic channel (MTCH). The MTCH delivers the actual content of the MBMS services while the MCCH delivers control information related to the MBMS. The MCCH might include key control information that specifies how the content in the MTCH is to be delivered.

The MCCH is used for a Point-to-Many (PtM) downlink transmission of control signaling information between a network and mobile devices in a particular coverage area. The control signaling information gives details about the MBMS services available in the coverage area and also specifies the radio bearer configuration (service specific) to receive the services from the coverage area. For example, the MCCH may specify parameters such as channel coding, frequency, or other transmission parameters. Once the MCCH messages are acquired, the MTCH can be setup to receive MBMS services through PtM bearers.

The MTCH is used for a downlink transmission of user plane information between network and mobile devices. The user plane information on the MTCH is MBMS Service specific and is sent to mobile devices with an activated MBMS service.

It will be assumed that the device 102 is currently in coverage area A and in communication BS1. For example, the device 102 is currently receiving a MBMS service 104 from BS1. When the device 102 moves from coverage area A into coverage area B, there may be a service disruption since the device 102 may continue receiving the MBMS service 106 only after reception of control signaling information from BS2 and setting up the appropriate traffic channels. Thus, a delay in service reception results that can last as long as tens of seconds depending on the protocol requirements of the transmission technology in use.

To overcome the problems of service disruption associated with conventional systems as describe above, the device 102 comprises service continuity apparatus 108. The apparatus 108 operates in accordance with the functions of the service continuity system disclosed herein to reduce or eliminate service disruptions as the device moves across coverage areas of the network 100. For example, in one implementation, the service continuity apparatus 108 operates to obtain and store control signaling information for new coverage areas while the device 102 is still receiving the MBMS 104 in coverage area A. As the signal from coverage area A fades, the stored control signaling information is used to quickly setup the appropriate traffic channels for reception of the MBMS service 106 in coverage area B so that a service disruption does not occur. A more detailed description of the operation of the service continuity apparatus 108 is provided below.

Thus, a service continuity system is provided that operates to reduce or eliminate service disruptions as a device moves across coverage areas of a wireless communication network. It should be noted that the network 100 represent just one implementation and that other implementations of the system are possible.

Figure 2:
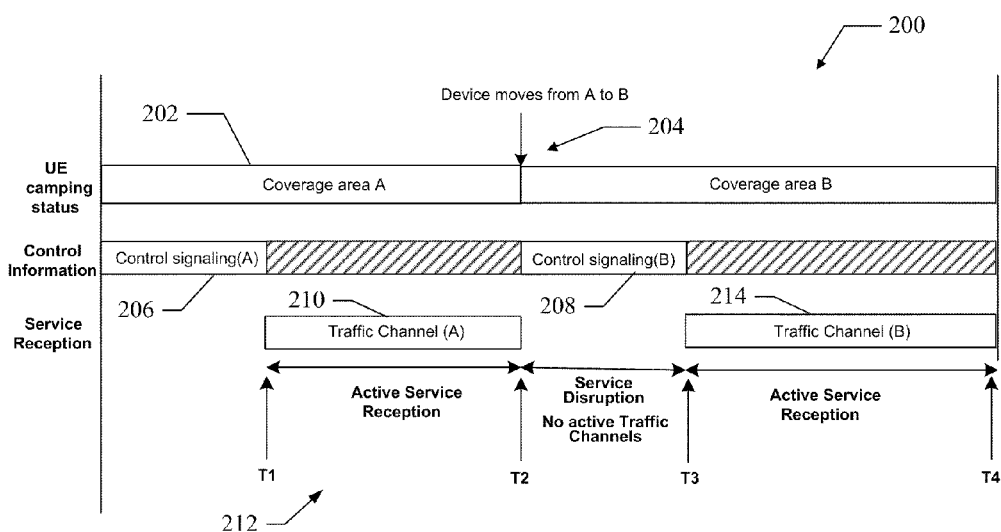
FIG. 2 shows a diagram illustrating service continuity problems associated with device mobility in conventional communication systems.

FIG. 2 shows a diagram 200 illustrating service continuity problems associated with device mobility in conventional communication systems. The diagram 200 is described below with reference to the network 100 shown in FIG. 1.

At reference 202, the device 102 is in coverage area A and receives control signaling information 206 from BS1. At reference 210, the device 102 uses the signaling information to establish traffic channel A in coverage area A with BS1. The timeline 212 indicates that between times T1 and T2, the device is in active service reception in coverage area A so that the MBMS service 104 from BS1 can be received.

At reference 204 (time T2), the device moves into coverage area B and receives control signaling information 208 from BS2. During the time interval T2-T3, the device experiences a service disruption so that the MBMS service previously received from BS1 is disrupted.

At reference 214, the device 102 uses control signaling information obtained at 208 to establish traffic channel B with BS2 in coverage area B. The timeline 212 indicates that between times T3 and T4 the device is in active service reception in coverage area B so that the MBMS service 106 from BS2 can be received. Unfortunately, the service disruption experienced between times T2 and T3 may be several seconds in length and result is an unsatisfactory user experience.

Figure 3:
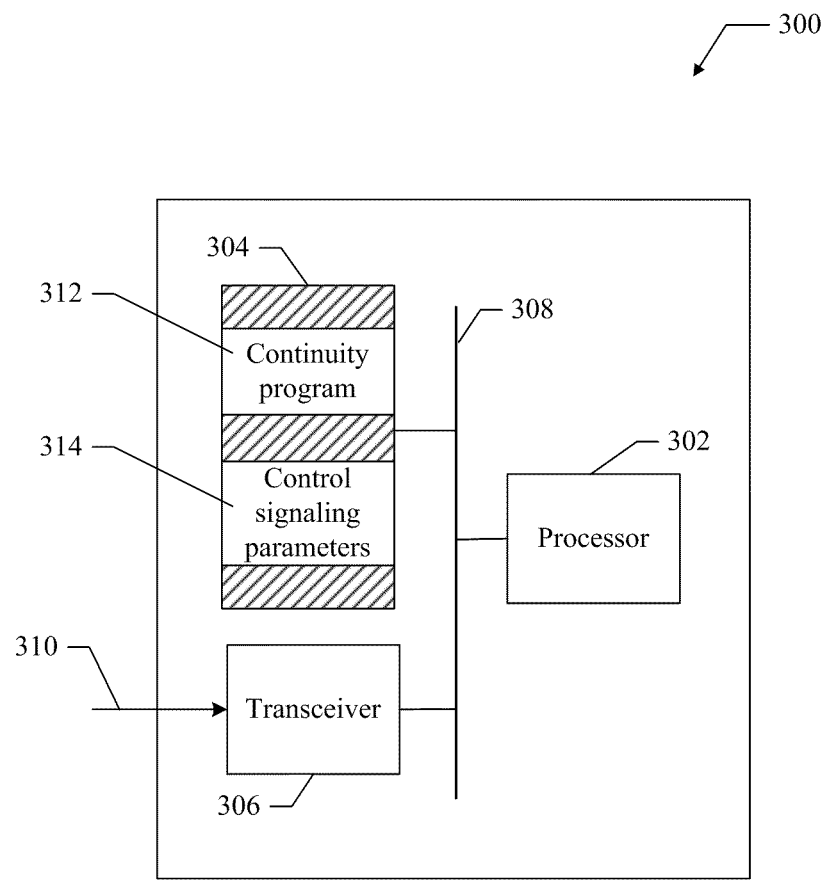
FIG. 3 shows an exemplary service continuity apparatus for use in implementations of the service continuity system.

FIG. 3 shows an exemplary service continuity apparatus 300 for use in implementations of the service continuity system. For example, the service continuity apparatus 300 is suitable for use as the service continuity apparatus 108 shown in FIG. 1. The service continuity apparatus 300 comprises processor 302, memory 304, and transceiver 306, which are coupled to communicate using data bus 308. It should be noted that the service continuity apparatus 300 illustrates just one implementation and that other implementations are possible. For example, the service continuity apparatus 300 may be implemented in one or more integrated circuits that provide the functionality of the service continuity system described herein.

The transceiver 306 comprises hardware and/or hardware executing software that is configured to allow the service continuity apparatus 300 to communicate data or other information over a network with remote devices or systems. For example, the transceiver 306 is configured to receive control signaling information and/or MBMS transmissions from base stations in one or more network coverage areas. Information received by the transceiver 306 is passed to the processor 302.

The memory 304 comprises a hard disk, optical disk, RAM, ROM, EEPROM and/or any other suitable memory device operable to allow information to be stored and retrieved. The memory 304 comprises a continuity program 312 which is a set of instructions or codes stored in the memory that are executable by the processor 302 to provide the functions of the service continuity system. The memory also comprises control signaling parameters 314 which identify control signaling information for one or more coverage areas. The control signaling parameters 314 can be used to establish traffic channels as the device moves from one coverage area to another.

The processor 302 comprises at least one of a CPU, processor, gate array, hardware logic, memory elements, virtual machine, and/or hardware executing software. Thus, in one implementation, the processor 302 comprises logic to execute machine-readable instructions, such as instructions of the continuity program 312. In another implementation, the processor 302 comprises dedicated logic to control one or more other elements of the service continuity apparatus 300 to provide the functions of the service continuity system described herein.

During operation, the processor 302 controls the transceiver 306 to collect control signaling information from nearby coverage areas. The control signaling information comprises modulation and coding schemes, channel configuration parameters, and/or any other type of control signaling information.

The control signaling information is stored in the memory 304 as part of the control signaling parameters 314 and can later be used to establish traffic channels to provide continuity of service to the mobile device as the device moves from one coverage area to another. A more detailed description of the various operating modes of the service continuity apparatus 300 is provided below.

The processor 302 operates to control the functions of the continuity apparatus to provide one or more of the following operating modes.

Mode 1—Maintain MBMS service reception provided in previous coverage area when moving into new coverage area until control signaling information for new coverage area is acquired and new traffic channels established.

Mode 2—Proactively acquire control signaling information for new coverage areas when available. Use control signaling information to establish new traffic channels when entering new coverage areas so that existing MBMS services in previous coverage area can continue to be received. This mode also is applicable during idle operation when no traffic channel exists in the current coverage area.

In one implementation, the service continuity system comprises a computer program product having one or more program instructions ("instructions") or sets of "codes" stored or embodied on a machine-readable medium, such as the continuity program 312 stored in the memory 304. When the codes are executed by at least one processor, for instance, the processor 302, their execution causes the service continuity apparatus 300 to provide the functions of the service continuity system described herein. For example, the machine-readable medium comprises a floppy disk, CDROM, memory card, FLASH memory device, RAM, ROM, or any other type of memory device or machine-readable medium that interfaces to the service continuity apparatus 300. In another aspect, the sets of codes may be downloaded into the service continuity apparatus 300 from an external device or communication network resource. The sets of codes, when executed, will cause the service continuity apparatus 300 to provide the functions of the service continuity system as described herein.

Mode 1

In this section, a first mode of operation for maintaining service continuity is described. In this mode, an overlapping time interval exists between the reception of services over a traffic channel of a previous coverage area (A) and reception of control channel information in a new coverage area (B). The overlapping time interval occurs after the mobile device has moved to the new coverage area B.

Figure 4:
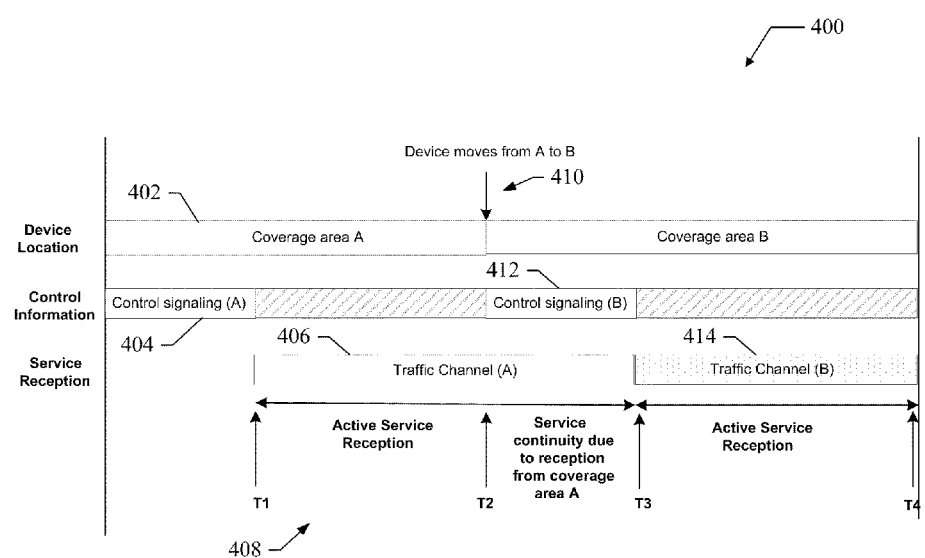
FIG. 4 shows an exemplary diagram illustrating a first mode of operation for service continuity provided by the service continuity system.

FIG. 4 shows an exemplary diagram 400 illustrating the operation of mode 1 for service continuity provided by the service continuity system. For clarity, the diagram 400 is described below with reference to the service continuity apparatus 300 shown in FIG. 3. For example, in one implementation, the processor 302 executes one or more instructions or sets of codes to control the service continuity apparatus 300 to perform the functions described below.

At reference 402, a device comprising the service continuity apparatus 300 is located in coverage area A of a wireless communication network. At reference 404, control signaling information for coverage area A is obtained and stored. For example, the processor 302 controls the transceiver 306 to acquire the control signaling information for coverage area A and store this information in the memory 304 as part of the control signaling parameters 314.

At reference 406, a traffic channel A is established in coverage area A. The traffic channel A is used to receive one or more MBMS services available in coverage area A. A timeline, shown generally at 408, illustrates that the traffic channel A is established at time T1.

At time T2, the device moves into coverage area B as indicated at reference 410. Once in coverage area B, the device acquires control signaling information for coverage area B as indicated at 412. The control signaling information allows the device to establish traffic channels in coverage area B. During the acquisition of the control signaling information 412, the device maintains the active traffic channel 406 with coverage area A and continues to receive the MBMS service. The overlap of service reception on traffic channel A and control signaling (B) acquisition indicated by the time interval between T2 and T3 ensures service continuity.

At time T3, the device establishes traffic channel B 414 in coverage area B. For example, traffic channel A 406 will be lost if its signal strength fades below a selected threshold value. Using the control signaling information acquired at 412, the device establishes traffic channel B 414. Since the device has previously acquired the control signaling information for coverage area B, the device is able to quickly switch to traffic channel B once traffic channel A starts to fade or is lost such that disruption of the MBMS service is minimized or eliminated. Between times T3 and T4 the device continues to receive the MBMS service on traffic channel B.

Therefore, the diagram 400 illustrates mode 1 operation provided by the service continuity system to obtain control signaling parameters for adjacent coverage areas so that new traffic channels can be quickly established as the device moves between coverage areas. As a result, service disruptions are reduced or eliminated.

Figure 5:
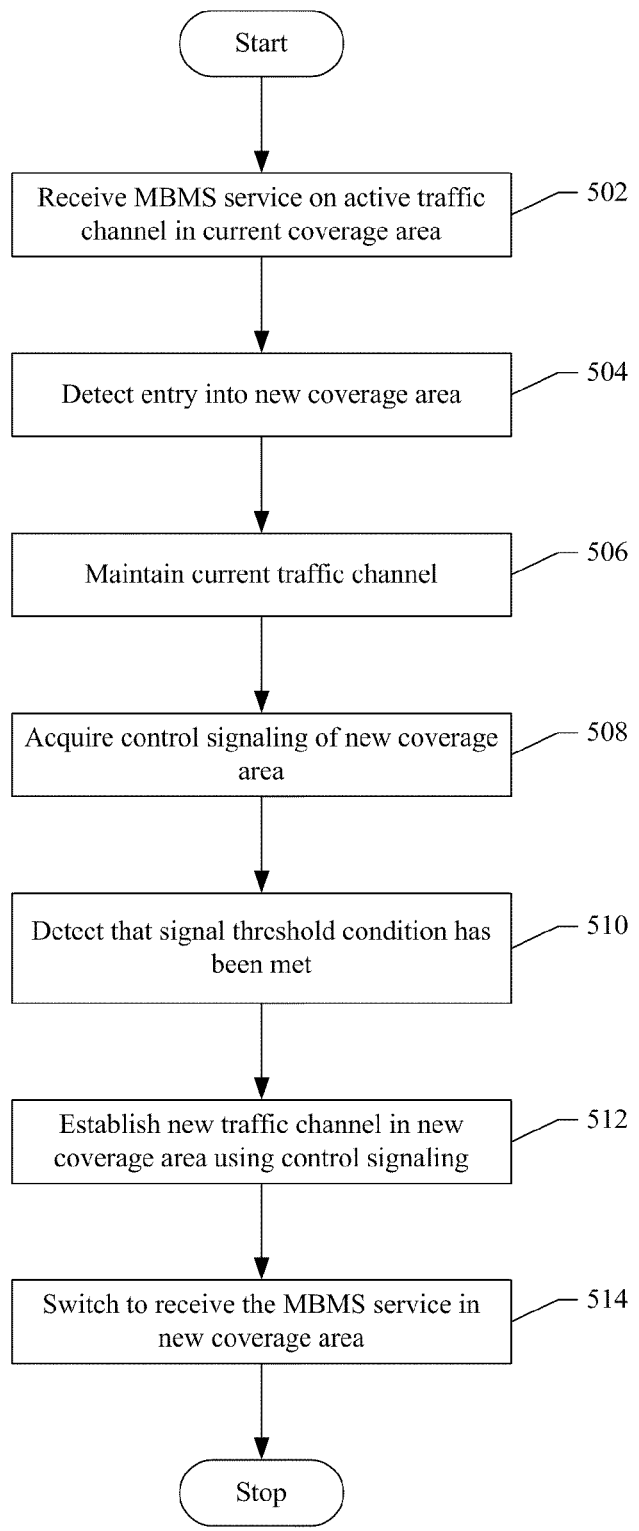
FIG. 5 shows an exemplary method for providing a first mode of operation for use in implementations of a service continuity system.

FIG. 5 shows an exemplary method 500 for providing a first mode of operation for use in implementations of a service continuity system. For clarity, the method 500 is described below with reference to the service continuity apparatus 300 shown in FIG. 3. In one implementation, the processor 302 executes one or more instructions or sets of codes to control the service continuity apparatus 300 to perform the functions described below. In another implementation, the functions described below are performed by one or more integrated circuits.

At block 502, a MBMS service is received on an active traffic channel in a first coverage area. For example, the processor 302 controls the transceiver 306 to receive control signaling parameters in the current coverage area. The control signaling parameters are used to establish one or more traffic channels in the current coverage area allowing a device to receive the MBMS service.

At block 504, it is detected that the device has entered a new coverage area. For example, the device moves from a first coverage area to a second coverage area. The move into the new coverage area is detected by the processor 302.

At block 506, the current traffic channel is maintained in the new coverage area. For example, the processor 302 controls the transceiver 306 to maintain the current traffic channel in the new coverage area so that the MBMS service can continue to be received.

At block 508, control signaling information of the new coverage area is acquired. For example, the processor 302 controls the transceiver 306 to receive control signaling parameters in the new coverage area. The control signaling parameters are passed to the processor 302 and stored in the memory 304.

At block 510, it is detected that a signal threshold condition has been met. For example, the transceiver 306 detects the signal strength of the traffic channel provided by the previous coverage area and determines that the signal strength has fallen below a selected threshold indicating that the traffic channel is fading.

At block 512, in response to the fading traffic channel from the previous coverage area, a new traffic channel in the new coverage area is established. For example, the processor 302 controls the transceiver 306 to utilize the control signaling parameters stored in the memory to establish one or more new traffic channels in the new coverage area.

At block 514, a switch to the new traffic channel is performed to receive the MBMS service on the new traffic channel in the new coverage area such that there is no or minimal service disruption. For example, the processor 302 controls the transceiver 306 to switch to the new traffic channel to receive the MBMS service before the previous traffic channel completely fades such that there is no or minimal disruption in the reception of the MBMS service.

Therefore, the method 500 operates to provide a first mode of operation provided by the service continuity system. It should be noted that the method 500 is just one implementation and that the operations of the method 500 may be rearranged or otherwise modified such that other implementations are possible.

Mode 2

In this section, a second operating mode for maintaining service continuity is described. In this mode, control information associated with neighboring coverage areas is proactively acquired before the mobile device moves away from the current coverage area. This mode operates to acquire the control information ahead of time and store it in memory so that it can be used to quickly configure traffic channels in the new coverage area as soon as the device moves to the new coverage area. Thus, service disruptions are reduced or eliminated. This mode is also applicable when the device is idle such that no traffic channel is active prior to the move to the new coverage area.

Figure 6:
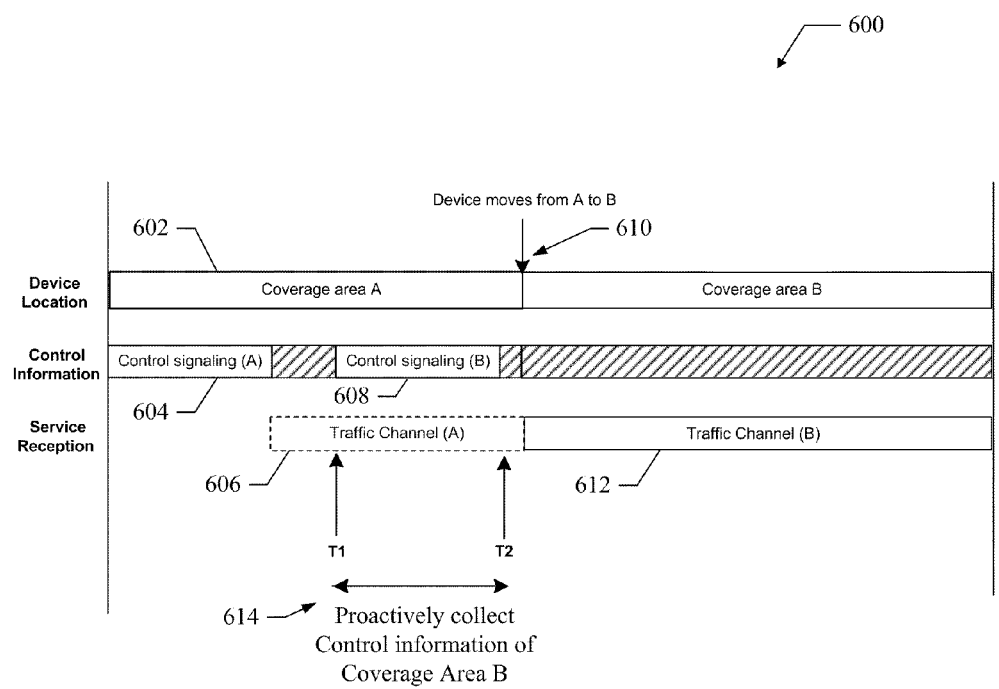
FIG. 6 shows an exemplary diagram illustrating a second mode of operation for service continuity provided by the service continuity system.

FIG. 6 shows an exemplary diagram 600 illustrating a second operating mode of the service continuity system. For clarity, the diagram 600 is described below with reference to the service continuity apparatus 300 shown in FIG. 3. In one implementation, the processing logic 302 executes one or more instructions or codes to control the service continuity apparatus 300 to perform the functions described below.

At reference 602, a device comprising the service continuity apparatus 300 is located in coverage area A of a wireless communication network. At reference 604, control signaling information for coverage area A is acquired and stored. For example, the processor 302 controls the transceiver 306 to acquire the control signaling information for coverage area A and store this information in the memory 306 as part of the control signaling parameters 316.

At reference 606, a traffic channel A is established in coverage area A. The traffic channel A is used to receive one or more MBMS services available in coverage area A. A timeline is shown generally at 614. Between times T1 and T2 control signaling information is acquired for coverage are B. For example, the device determines that the signal strength of coverage area B has reached a selected threshold indicating that control signaling information for that coverage area can be reliably acquired. It should also be noted that traffic channel A need not be established so that the device is in idle mode while in coverage area A.

At reference 610, the device moves from coverage area A to coverage area B. Since the device already has acquired the control signaling information for coverage area B, the traffic channel B 612 can be quickly established such that there is no or only minimal disruption in the reception of the MBMS service on traffic channel B. If the device was in idle mode in coverage area A, traffic channel B may still be quickly established when the device moves in coverage area B since the control signaling parameters for coverage area B have already been acquired.

Therefore, the diagram 600 illustrates a second operating mode provided by the service continuity system which operates to obtain control signaling parameters for adjacent coverage areas so that new traffic channels can be quickly established as the device moves into a new coverage area. As a result, service disruptions are reduced or eliminated.

Figure 7:
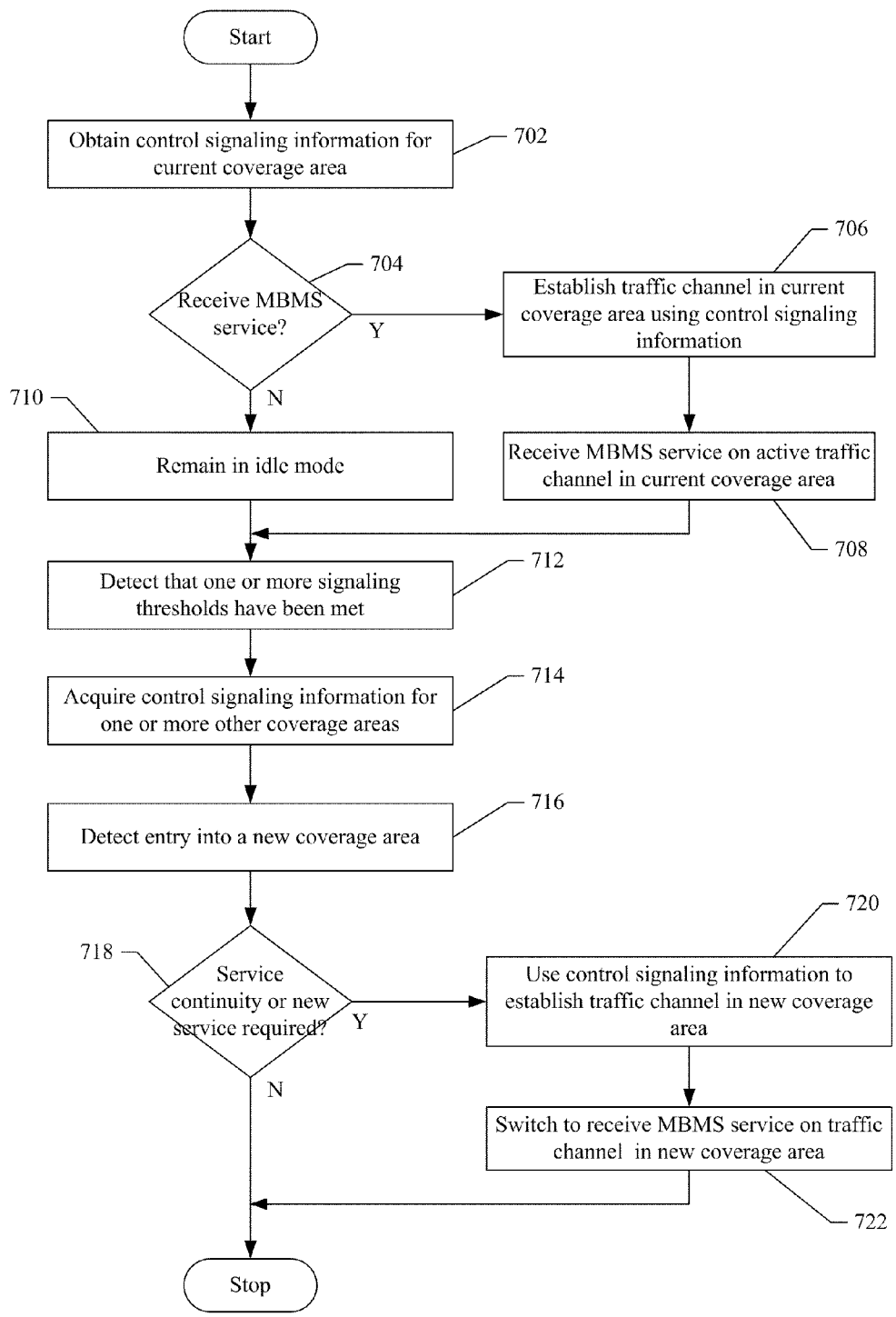
FIG. 7 shows an exemplary method for providing a second mode of operation for use in implementations of a service continuity system.

FIG. 7 shows an exemplary method 700 for providing a second operating mode for use in aspects of a service continuity system. For clarity, the method 700 is described below with reference to the service continuity apparatus 300 shown in FIG. 3. In one implementation, the processor 302 executes one or more instructions or sets of codes to control the service continuity apparatus 300 to perform the functions described below. In another implementation, the functions described below are performed by one or more integrated circuits.

At block 702, control signaling information for a current coverage area is acquired. For example, the processor 302 controls the transceiver 306 to receive control signaling parameters in the current coverage area. The control signaling parameters are passed to the processor 302 and stored in the memory 304.

At block 704, a determination is made as to whether or not a MBMS service is to be received. For example, the processor 302 makes this determination based on user input or other stored information. If a MBMS service is to be received, the method proceeds to block 706. If no MBMS is to be received, the method proceeds to block 710.

At block 706, one or more traffic channels are established to receive the MBMS service in the current coverage area. For example, the processor 302 controls the transceiver 306 to use the stored control signaling information to establish the traffic channels.

At block 708, the desired MBMS service is received on the established traffic channels in the current coverage area. For example, the transceiver 306 receives the MBMS service and passes the information to the processor 302.

At block 710, the device remains in an idle mode since no traffic channels have been established.

At block 712, it is detected that one or more signaling thresholds have been met. For example, the transceiver 306 detects that control signaling information associated with other coverage area can be received at the device's current location. In one implementation, to make this detection, the transceiver detects that the signal strength of control signal transmissions from one or more other coverage areas has reached a selected threshold whereby the associated control signaling information can be accurately received.

At block 714, control signaling information is acquired for one or more coverage areas. For example, the processor 302 controls the transceiver 306 to acquire control signaling parameters for each coverage area whose transmission strength meets a selected threshold value. The control signaling parameters are passed to the processor 302 and stored in the memory 304.

At block 716, it is detected that the device has entered a new coverage area. For example, the transceiver 306 detects that the device has moved in a new coverage area based on received signal transmissions.

At block 718, a determination is made as to whether service continuity or a new service is required. For example, if a MBMS service is currently being received from a previous coverage area then service continuity is required to continue to receive the MBMS service in the new coverage area. In one implementation, the processor 302 makes this determination. If service continuity is required, the method proceeds to block 720.

If a new MBMS service is required, the method proceeds to block 720 to set up traffic channels to receive the new service. If service continuity or a new service is not required, the method ends.

It should be noted that if a new service is required, the control signaling parameters for the new coverage area are already stored in the memory 304 and can be quickly accessed to establish a new traffic channel in the new coverage area to receive the new MBMS service. As a result, any delay associated with service continuation, activation, or initiation will be minimized.

At block 720, the stored control signaling information for the new coverage area is retrieve from the memory 304 and used to establish a new traffic channel in the new coverage area. For example, the processor 302 retrieves the control signaling parameters from the memory 304 and controls the transceiver 306 to use the control signaling parameters to establish a new traffic channel.

At block 722, a switch is performed to receive MBMS service on a traffic channel in the new coverage area. In one implementation, the MBMS service is a continuation of services received at block 708. For example, the device receiving the service has moved into a new coverage area and the reception of service continues in the new coverage area. In this case, the service continuity system operates to minimize or eliminate interruptions in service reception during reselection.

In another implementation, reception of a new service is started in the new coverage area. For example, the device was operating in an idle mode before moving in the new coverage area. In this case, the service continuity system operates to initiate service reception in the new coverage area so that delay of service initiation is minimized as a device moves into a new coverage area.

Therefore, the method 700 operates to provide a second mode of operation in accordance with the service continuity system. It should be noted that the method 700 is just one implementation and that the operations of the method 700 may be rearranged or otherwise modified such that other implementations are possible.

Figure 8:
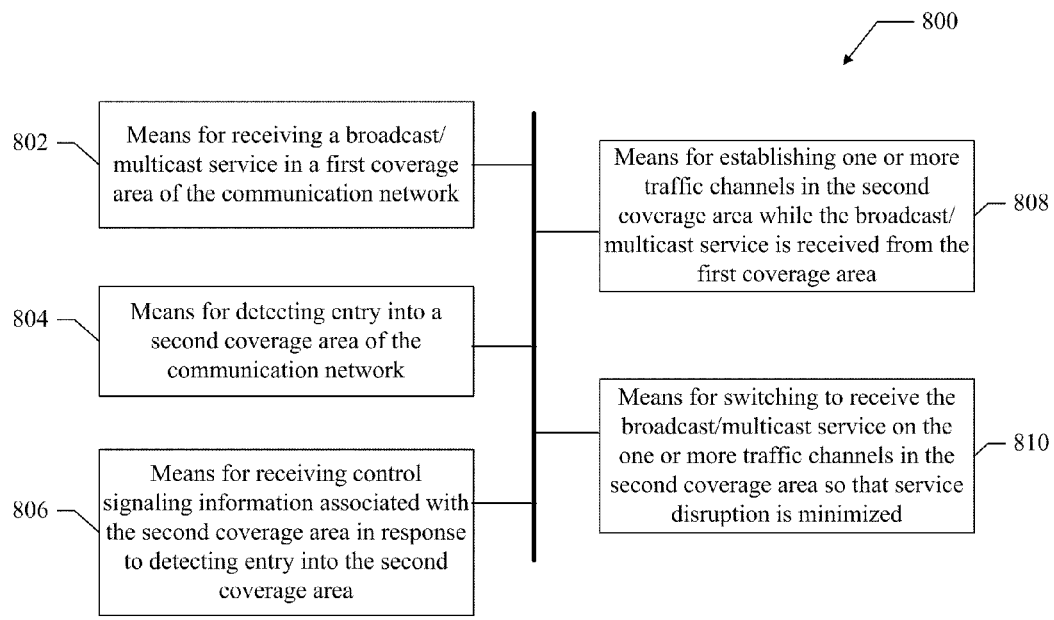
FIG. 8 shows an exemplary service continuity apparatus for use in implementations of the service continuity system.

FIG. 8 shows an exemplary service continuity apparatus 800 for use in aspects of a service continuity system. For example, the apparatus 800 is suitable for use as the service continuity apparatus 108 shown in FIG. 1. In one implementation, the apparatus 800 is implemented by at least one integrated circuit comprising one or more modules configured to provide aspects of a service continuity system as described herein. For example, each module comprises hardware and/or hardware executing software.

The apparatus 800 comprises a first module comprising means (802) for receiving a broadcast/multicast service in a first coverage area of the communication network, which in an aspect comprises the transceiver 310. The apparatus 800 also comprises a second module comprising means (804) for detecting entry into a second coverage area of the communication network, which in an aspect comprises processor 302. The apparatus 800 also comprises a third module comprising means (806) for receiving control signaling information associated with the second coverage area in response to detecting entry into the second coverage area, which in an aspect comprises the processor 302. The apparatus 800 also comprises a fourth module comprising means (806) for establishing one or more traffic channels in the second coverage area while the broadcast/multicast service is received from the first coverage area, which in an aspect comprises the processor 302. The apparatus 800 also comprises a fifth module comprising means (806) for switching to receive the broadcast/multicast service on the one or more traffic channels in the second coverage area so that service disruption is minimized, which in an aspect comprises the processor 302.

Figure 9:
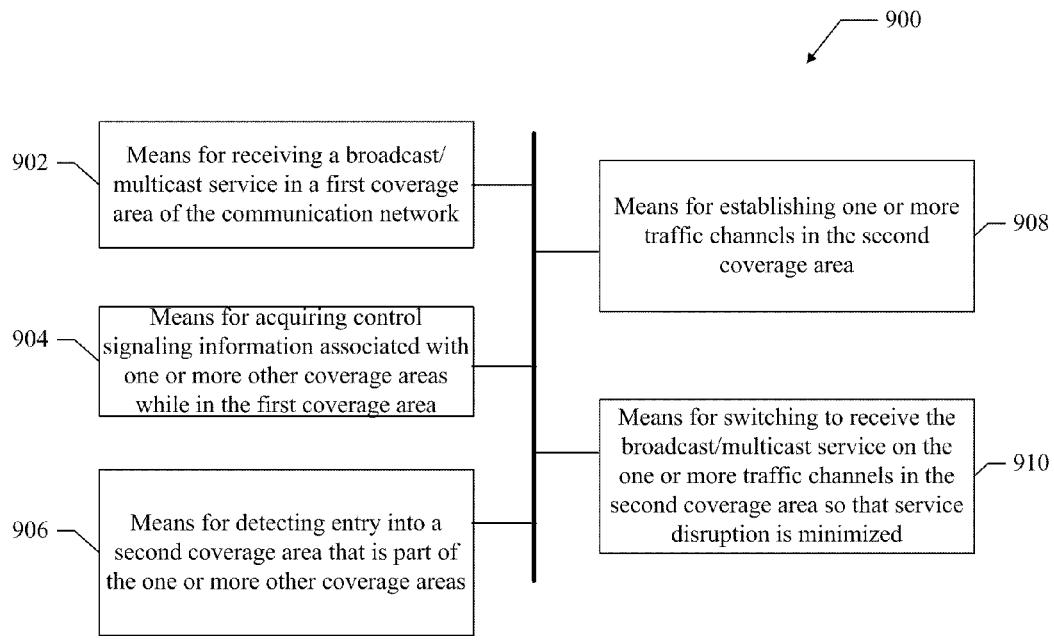
FIG. 9 shows an exemplary service continuity apparatus for use in implementations of the service continuity system.

FIG. 9 shows an exemplary service continuity apparatus 900 for use in aspects of a service continuity system. For example, the apparatus 900 is suitable for use as the service continuity apparatus 109 shown in FIG. 1. In one implementation, the apparatus 900 is implemented by at least one integrated circuit comprising one or more modules configured to provide aspects of a service continuity system as described herein. For example, each module comprises hardware and/or hardware executing software.

The apparatus 900 comprises a first module comprising means (902) for receiving a broadcast/multicast service in a first coverage area of the communication network, which in an aspect comprises the transceiver 310. The apparatus 900 also comprises a second module comprising means (904) for acquiring control signaling information associated with one or more other coverage areas while in the first coverage area, which in an aspect comprises the processor 302. The apparatus 900 also comprises a third module comprising means (906) for detecting entry into a second coverage area that is part of the one or more other coverage areas, which in an aspect comprises the processor 302. The apparatus 900 also comprises a fourth module comprising means (908) for establishing one or more traffic channels in the second coverage area, which in an aspect comprises the processor 302. The apparatus 900 also comprises a fifth module comprising means (910) for switching to receive the broadcast/multicast service on the one or more traffic channels in the second coverage area so that service disruption is minimized, which in an aspect comprises the processor 302.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a service continuity system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for providing service continuity in a communication network, the method comprising:
    receiving a broadcast/multicast service in a first coverage area of the communication network;
    detecting entry into a second coverage area that is outside the first coverage area of the communication network;
    receiving a multicast control channel (MCCH) comprising control signaling information associated with the second coverage area in response to detecting entry into the second coverage area;
    establishing one or more traffic channels in the second coverage area based on the control signaling information while the broadcast/multicast service is received from the first coverage area;
    switching to receive the broadcast/multicast service on the one or more traffic channels in the second coverage area so that service disruption is minimized; and
    releasing traffic channels in the first coverage area after receiving the broadcast/multicast service on the one or more traffic channels in the second coverage area.

2. The method of claim 1, wherein said detecting comprises detecting that signal power of a signal associated with the second coverage area is above a selected threshold.

3. The method of claim 1, wherein the control signaling information comprises radio bearer configuration information.

4. The method of claim 1, wherein said establishing comprises establishing the one or more traffic channels in the second coverage area using the control signaling information.

5. The method of claim 1, wherein said switching comprises detecting that signal power of a signal associated with the first coverage area is below a selected threshold.

6. An apparatus for providing service continuity in a communication network, the apparatus comprising:
    a transceiver configured to receive a broadcast/multicast service in a first coverage area of the communication network; and
    a processor coupled to the transceiver and configured to:
        detect entry into a second coverage area that is outside the first coverage area of the communication network;
        receive a multicast control channel (MCCH) comprising control signaling information associated with the second coverage area in response to detecting entry into the second coverage area;
        establish one or more traffic channels in the second coverage area based on the control signaling information while the broadcast/multicast service is received from the first coverage area;
        switch to receive the broadcast/multicast service on the one or more traffic channels in the second coverage area so that service disruption is minimized; and
        release traffic channels in the first coverage area after receiving the broadcast/multicast service on the one or more traffic channels in the second coverage area.

7. The apparatus of claim 6, wherein said processor is configured to detect entry into a second coverage area when signal power of a signal associated with the second coverage area is above a selected threshold.

8. The apparatus of claim 6, wherein the control signaling information comprises radio bearer configuration information.

9. The apparatus of claim 6, wherein said processor is configured to establish the one or more traffic channels in the second coverage area using the control signaling information.

10. The apparatus of claim 6, wherein said processor is configured to switch when signal power of a signal associated with the first coverage area is below a selected threshold.

11. An apparatus for providing service continuity in a communication network, the apparatus comprising:
    means for receiving a broadcast/multicast service in a first coverage area of the communication network;
    means for detecting entry into a second coverage area that is outside the first coverage area of the communication network;
    means for receiving a multicast control channel (MCCH) comprising control signaling information associated with the second coverage area in response to detecting entry into the second coverage area;
    means for establishing one or more traffic channels in the second coverage area based on the control signaling information while the broadcast/multicast service is received from the first coverage area;
    means for switching to receive the broadcast/multicast service on the one or more traffic channels in the second coverage area so that service disruption is minimized; and
    means for releasing traffic channels in the first coverage area after receiving the broadcast/multicast service on the one or more traffic channels in the second coverage area.

12. The apparatus of claim 11, wherein said means for detecting comprises means for detecting that signal power of a signal associated with the second coverage area is above a selected threshold.

13. The apparatus of claim 11, wherein the control signaling information comprises radio bearer configuration information.

14. The apparatus of claim 11, wherein said means for establishing comprises means for establishing the one or more traffic channels in the second coverage area using the control signaling information.

15. The apparatus of claim 11, wherein said means for switching comprises means for detecting that signal power of a signal associated with the first coverage area is below a selected threshold.

16. A computer program product for providing service continuity in a communication network, the computer program product comprising:
    a non transitory computer-readable medium embodying codes executable by a processor to:
    receive a broadcast/multicast service in a first coverage area of the communication network;
    detect entry into a second coverage area that is outside the first coverage area of the communication network;
    receive a multicast control channel (MCCH) comprising control signaling information associated with the second coverage area in response to detecting entry into the second coverage area;
    establish one or more traffic channels in the second coverage area based on the control signaling information while the broadcast/multicast service is received from the first coverage area;

switch to receive the broadcast/multicast service on the one or more traffic channels in the second coverage area so that service disruption is minimized; and release traffic channels in the first coverage area after receiving the broadcast/multicast service on the one or more traffic channels in the second coverage area.

17. The non transitory computer-readable medium of claim 16, wherein said codes are configured to cause the processor to detect entry into a second coverage area when signal power of a signal associated with the second coverage area is above a selected threshold.

18. The non transitory computer-readable medium of claim 16, wherein the control signaling information comprises radio bearer configuration information.

19. The non transitory computer-readable medium of claim 16, wherein said codes are configured to cause the processor to establish the one or more traffic channels in the second coverage area using the control signaling information.

20. The non transitory computer-readable medium of claim 16, wherein said codes are configured to cause the processor to switch when signal power of a signal associated with the first coverage area is below a selected threshold.

21. A method for providing service continuity in a communication network, the method comprising:
receiving a broadcast/multicast service in a first coverage area of the communication network;
acquiring a multicast control channel (MCCH) comprising control signaling information associated with one or more other coverage areas that are outside the first coverage area while in the first coverage area;
detecting entry into a second coverage area that is part of the one or more other coverage areas;
establishing one or more traffic channels in the second coverage area based on the control signaling information;
switching to receive the broadcast/multicast service on the one or more traffic channels in the second coverage area so that service disruption is minimized; and
releasing traffic channels in the first coverage area after receiving the broadcast/multicast service on the one or more traffic channels in the second coverage area.

22. The method of claim 21, wherein said detecting comprises detecting that signal power of a signal associated with the second coverage area is above a selected threshold.

23. The method of claim 21, wherein the control signaling information comprises radio bearer configuration information.

24. The method of claim 21, wherein said establishing comprises establishing the one or more traffic channels in the second coverage area using selected control signaling information associated with the second coverage area.

25. The method of claim 21, wherein said switching comprises detecting that signal power of a signal associated with the first coverage area is below a selected threshold.

26. An apparatus for providing service continuity in a communication network, the apparatus comprising:
a transceiver for receiving a broadcast/multicast service in a first coverage area of the communication network; and
a processor coupled to the transceiver and configured to:
acquire a multicast control channel (MCCH) comprising control signaling information associated with one or more other coverage areas that are outside the first coverage area while in the first coverage area;
detect entry into a second coverage area that is part of the one or more other coverage areas;
establish one or more traffic channels in the second coverage area based on the control signaling information;
switch to receive the broadcast/multicast service on the one or more traffic channels in the second coverage area so that service disruption is minimized; and
release traffic channels in the first coverage area after receiving the broadcast/multicast service on the one or more traffic channels in the second coverage area.

27. The apparatus of claim 26, wherein said processor is configured to detect entry into a second coverage area when signal power of a signal associated with the second coverage area is above a selected threshold.

28. The apparatus of claim 26, wherein the control signaling information comprises radio bearer configuration information.

29. The apparatus of claim 26, wherein said processor is configured to establish the one or more traffic channels in the second coverage area using selected control signaling information associated with the second coverage area.

30. The apparatus of claim 26, wherein said processor is configured to switch when signal power of a signal associated with the first coverage area is below a selected threshold.

31. An apparatus for providing service continuity in a communication network, the apparatus comprising:
means for receiving a broadcast/multicast service in a first coverage area of the communication network;
means for acquiring a multicast control channel (MCCH) comprising control signaling information associated with one or more other coverage areas that are outside the first coverage area while in the first coverage area;
means for detecting entry into a second coverage area that is part of the one or more other coverage areas;
means for establishing one or more traffic channels in the second coverage area based on the control signaling information;
means for switching to receive the broadcast/multicast service on the one or more traffic channels in the second coverage area so that service disruption is minimized; and
means for releasing traffic channels in the first coverage area after receiving the broadcast/multicast service on the one or more traffic channels in the second coverage area.

32. The apparatus of claim 31, wherein said means for detecting comprises means for detecting that signal power of a signal associated with the second coverage area is above a selected threshold.

33. The apparatus of claim 31, wherein the control signaling information comprises radio bearer configuration information.

34. The apparatus of claim 31, wherein said means for establishing comprises means for establishing the one or more traffic channels in the second coverage area using selected control signaling information associated with the second coverage area.

35. The apparatus of claim 31, wherein said means for switching comprises means for detecting that signal power of a signal associated with the first coverage area is below a selected threshold.

36. A computer program product for providing service continuity in a communication network, the computer program product comprising:
a non transitory computer-readable medium embodying codes executable by a processor to:
receive a broadcast/multicast service in a first coverage area of the communication network;

acquire a multicast control channel (MCCH) comprising control signaling information associated with one or more other coverage areas that are outside the first coverage area while in the first coverage area;

detect entry into a second coverage area that is part of the one or more other coverage areas;

establish one or more traffic channels in the second coverage area based on the control signaling information;

switch to receive the broadcast/multicast service on the one or more traffic channels in the second coverage area so that service disruption is minimized; and release traffic channels in the first coverage area after receiving the broadcast/multicast service on the one or more traffic channels in the second coverage area.

37. The non transitory computer-readable medium of claim 36, wherein said codes are configured to cause the processor to detect entry into a second coverage area when signal power of a signal associated with the second coverage area is above a selected threshold.

38. The non transitory computer-readable medium of claim 36, wherein the control signaling information comprises radio bearer configuration information.

39. The non transitory computer-readable medium of claim 36, wherein said codes are configured to cause the processor to establish the one or more traffic channels in the second coverage area using selected control signaling information associated with the second coverage area.

40. The non transitory computer-readable medium of claim 36, wherein said codes are configured to cause the processor to switch when signal power of a signal associated with the first coverage area is below a selected threshold.

* * * * *